United States Patent [19]

Beck et al.

[11] Patent Number: 4,761,521

[45] Date of Patent: Aug. 2, 1988

[54] DRAWOUT AND INTERLOCK ASSEMBLY FOR MOLDED CASE CIRCUIT BREAKERS

[75] Inventors: Henry R. Beck, Thetford Center, Vt.; James E. Ferree, Lawrenceville, Ga.; Alan J. Ludwig, deceased, late of Trafford, Pa., by Donna L. Lugwig, administratrix

[73] Assignee: Westinghouse Electric Corp., Pittsburgh, Pa.

[21] Appl. No.: 72,942

[22] Filed: Jul. 13, 1987

[51] Int. Cl.⁴ .............................................. H01H 9/20
[52] U.S. Cl. ................................................ 200/50 AA
[58] Field of Search ............ 200/50 A, 50 AA, 153 G; 361/336, 337, 338, 339

[56] References Cited

U.S. PATENT DOCUMENTS

| | | | |
|---|---|---|---|
| 2,273,002 | 2/1942 | Mahoney | 361/337 |
| 2,544,314 | 3/1951 | Hebbel, Jr. | 200/50 AA |
| 2,678,976 | 5/1954 | Caswell | 200/50 AA |
| 2,777,024 | 1/1957 | West | 200/50 A |
| 3,343,042 | 9/1967 | Cellerini et al. | 361/339 |
| 4,012,610 | 3/1977 | Ericson et al. | 200/50 AA |
| 4,531,174 | 7/1985 | Rickmann | 200/50 AA X |
| 4,644,120 | 2/1987 | Tedesco | 200/153 G |

Primary Examiner—J. R. Scott
Attorney, Agent, or Firm—L. P. Johns

[57] ABSTRACT

A drawout and interlock assembly for manually inserting a low-voltage molded case circuit breaker into positive electrical engagement with the plug-in power terminals of a distribution switchboard panel and then withdraw the breaker into a disconnected-test position is disclosed. The drawout position of the assembly comprises a pair of guide rails and a pair of drive rails that are secured to the back of the circuit breaker housing and cooperate with a pair of support rails and a drive mechanism that are secured to the stationary power blocks of the switchboard panel to effect a sliding telescopic interfitting of parts that permits the circuit breaker to be manually racked into connected and disconnected-test positions in an efficient reliable manner with a minimum number of parts. Automatic tripping of the breaker before it is connected to or disconnected from the switchboard panel is achieved by a toggle-actuated interlock lever that engages a depressable interlock button on the back of the circuit breaker housing when the drive mechanism is moved by an operating handle.

10 Claims, 9 Drawing Sheets

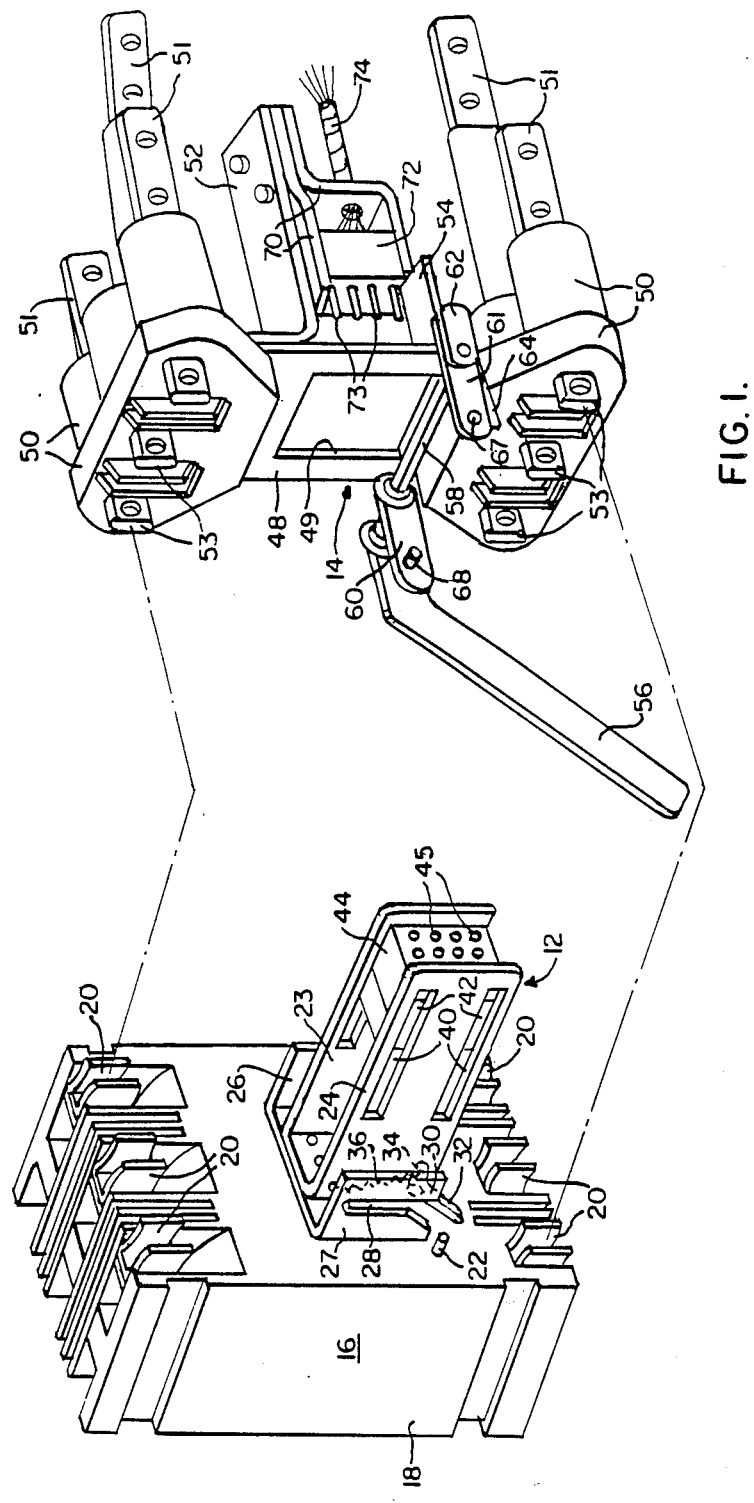

DRAWOUT AND INTERLOCK ASSEMBLY FOR MOLDED CASE CIRCUIT BREAKERS

BACKGROUND OF THE INVENTION

1. Field of the Invention

This invention generally relates to circuit breakers and, more particularly, to an improved drawout and interlock assembly for manually racking a low-voltage circuit breaker of the molded case type into and out of operative relationship with the panelboard of distribution switchboard apparatus.

2. Description of the Prior Art

In certain types of low-voltage distribution switchboard and power assemblies it is frequently necessary to mount the individual circuit breakers within a protective metal enclosure in such a manner that the breakers can be drawn out of engagement with the panelboard for replacement or test purposes and then be returned to its original connected position in a convenient and positive manner. Various kinds of drawout mechanisms have been developed and used in the prior art for this purpose and are disclosed in the following U.S. Pat. Nos.: 2,273,002 (Mahoney); 2,544,314 (Hebbel, Jr.); 2,678,976 (Caswell); 2,777,024 (West); 3,343,042 (Cellerini et al.) and 4,012,610 (Ericson et al.).

While the prior art drawout assemblies were satisfactory from a functional standpoint and, in some embodiments, were provided with an interlock arrangement for tripping the circuit breaker at predetermined times during the drawout operation, they were complicated and required a large number of parts which made them difficult and expensive to manufacture. The coaction required between the various components of the prior art drawout and interlock assemblies to provide the smooth reciprocal movement of the breaker necessitated the use of skilled maintenance men to maintain the apparatus in working condition. This further increased the cost of ensuring that the equipment operated in a positive reliable manner over long periods of time in different environments.

The foregoing problems and disadvantages associated with the prior art structures are avoided in accordance with the present invention by providing a drawout and interlock assembly which permits a low-voltage circuit breaker to be manually racked into connected and disconnected-test positions relative to the panelboard of the distribution switchboard apparatus in a very positive and efficient manner with a minimum of parts. These objectives are achieved by mounting a laterally-extending coupler structure to the back of the circuit breaker and securing a laterally-extending receptor structure to the stationary plug-in power components of the panelboard in such a position that the receptor structure slidingly receives and engages the coupler structure in telescopic fashion during the drawout and draw-in operations. The receptor structure includes a drive mechanism that is rotated by an operating handle and pivotally engages slotted portions of the coupler structure in cam-like fashion such that the circuit breaker is reciprocally moved toward and away from the power plug-in components when the handle is actuated. A spring-biased interlock lever is operated in toggle-like fashion by an actuating arm that comprises part of the drive means and cooperates with the interlock lever in such a manner during the drawout and draw-in operations that the interlock lever automatically depresses an interlock button on the back of the circuit breaker which permits the breaker to operate in the normal manner when the breaker has been racked into its disconnected-test position by the drawout assembly.

A pair of secondary plug-in connector components are mounted on the receptor and coupler structures in such a way that they are automatically compressed into mating engagement during the initial draw-in operation and then remain connected as long as the circuit breaker is held in operative relationship with the panel switchboard by the drawout mechanism. These secondary conductor components permit the control and test circuit components of the breaker to be tested when the circuit breaker is in its drawout position and disconnected from the power plug-in terminals of the panelboard.

The construction and structural organization of the various parts of the interlock mechanism and coupler and receptor structures of the drawout assembly are such that the desired manual racking of the circuit breaker into and out of the panelboard of the distribution switchboard apparatus is accomplished in a very positive and reliable manner with parts that are rugged and readily manufactured and assembled and whose number is a minimum.

BRIEF DESCRIPTION OF THE DRAWINGS

FIG. 1 is an exploded pictorial view of the coupler and receptor subassemblies which comprise the two basic parts of the drawout assembly according to the invention, the coupler subassembly being secured to the back of a molded case type circuit breaker and the receptor subassembly being secured to the stationary power plug-in blocks of the distribution panelboard.

DESCRIPTION OF THE PREFERRED EMBODIMENT

While the present invention can be used to manually rack various kinds and sizes of circuit breakers into and out of electrical engagement with associated circuit apparatus, it is especially adapted for use in manually moving a low voltage circuit breaker of the molded case type into and out of engagement with the plug-in power blocks of a distribution panelboard and it has accordingly been so illustrated and will be so described.

Figure 1A:
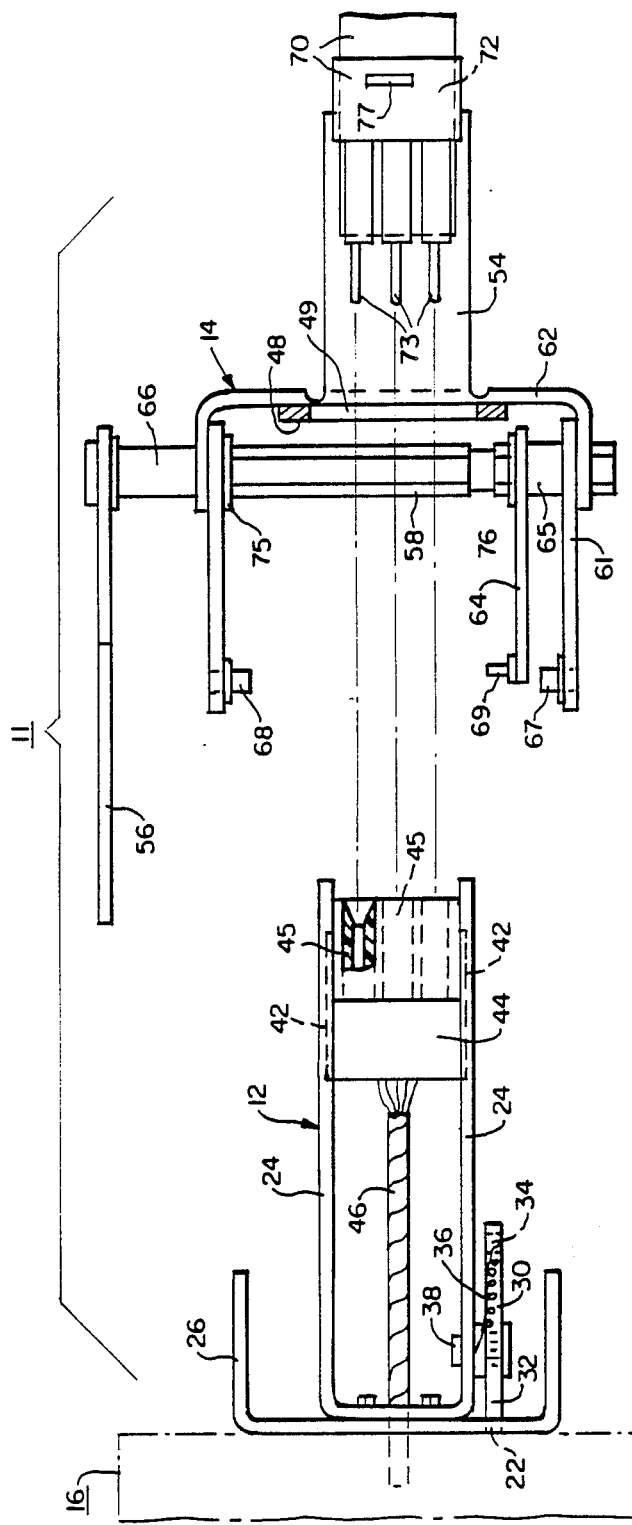
FIG. 1A is an enlarged plan view of the drawout assembly shown in FIG. 1 with the coupler and receptor structures in spaced-apart exploded relationship for purposes of illustration.

As shown in FIGS. 1 and 1A, the drawout assembly 11 of the present invention generally comprises a coupler subassembly 12 and a receptor subassembly 14 that are constructed to slidingly interfit with one another in telescopic fashion. The coupler subassembly 12 is securely fastened to the back wall of a low voltage molded case circuit breaker 16 of the type generally used in low voltage distribution switchboards and power assemblies. The circuit breaker 16 is illustrated in upstanding position and is disposed to move into and out of a switchboard (not shown) through a suitable opening in the control panel of a switchboard. The circuit breaker 16 contains the usual pairs of contacts that are moved into and out of engagement with one another by an operating means that is controlled by a trip mechanism in the well-known manner. A typical three-phase low-voltage circuit breaker is disclosed in U.S. Pat. No. 4,644,120, issued Feb. 17, 1987 to R. J. Tedesco, and the structural details of the breaker illustrated and described in this patent are incorporated herein by reference.

The circuit breaker 16 has a housing 18 of generally rectangular configuration with a plurality of U-shaped terminal clips 20 located along the upper and lower portions of the back wall of the housing 18 in oppositely disposed paired relationship. In accordance with the present invention, the circuit breaker 16 is provided with a spring-loaded depressible interlock button 22 that protrudes from the back wall of the breaker housing 18 and is attached to the trip bar (not shown) of the breaker 16 in such a fashion that it causes the breaker 16 to trip when the button is not depressed and projects outwardly from the back of the breaker 16. As will be noted, the interlock button 22 is located in close proximity to one side of the receptor subassembly 12 and one of the clip terminals 20 located at the bottom of the circuit breaker 16.

The coupler subassembly 12 generally comprises a pair of guide rails 23, 24 that extend laterally from the back of the circuit breaker housing 16 and are disposed in upstanding parallel spaced-apart relationship between a pair of drive rails 26, 27 that also extend laterally from the circuit breaker housing 16 and are arranged in outboard spaced-apart relationship with the guide rails 23, 24. The drive rails 26, 27 are shorter than the guide rails 23, 24 and are each provided with a slot 28 that extends upwardly from the bottom edge of the respective drive rails. The guide rail 23 on the left side of the coupler subassembly 12 (as viewed in FIG. 1) is provided with a pivoted interlock lever 30 (on the guide rail 23) of generally L-shaped configuration that is so arranged that the lower arm segment 32 of the lever strikes the interlock button 22 and pushes it into the circuit breaker 16 when the interlock lever 30 is rotated in clockwise direction, as viewed in FIG. 1. The position of the interlock lever 30 thus controls the operational status of the circuit breaker 16 through the interaction of the lower arm segment 32 of the lever 30 with the depressible interlock button 22 on the back of the breaker 16. When the interlock lever 30 is rotated to engage and depress the interlock button 22, the breaker can then be operated in normal fashion. When the interlock lever 30 is rotated counterclockwise to swing the lower arm 32 away from the interlock button 22 a distance sufficient to release the button 22, the circuit breaker 16 is tripped and automatically placed in contact-open condition.

The position of the L-shaped interlock lever 30 is controlled by a compression spring 36 that is fastened to the upper arm 34 of the lever 30 and an upper part of the adjacent guide rail 23 at a location such that the spring 36 rotates the interlock lever clockwise in toggle-like fashion into its button-engaging position shown in FIGS. 1 and 1A. The interlock lever 30 is pivotally attached to the guide rail 23 by a suitable pivot pin 38 that extends through the V-shaped medial part of the lever 30.

To facilitate operation of the spring 36 a spring guide rod 37 extends through the spring. The upper end of the rod is pivotally and slidably mounted through a hole in an L-shaped bracket 39 that is mounted on the guide rail 23. The lower end of the spring 36 is threadedly mounted in a pin 41 that is pivotally seated in a hole 43 in the upper arm 34 where it is retained in a suitable manner such as a cotter pin (not shown). The spring 36 is compressed between the bracket 39 and the pin 41. The spring guide rod 37 prevents the compression spring 36 from buckling.

As shown in FIG. 1, each of the guide rails 23, 24 is provided with a pair of slots 40 which slidingly accommodate protruding lobes 42 of a secondary connector component 44 that is disposed between the guide rails 23, 24 and is thus movable with respect to the coupler subassembly 12. The connector component 44 (FIG. 1A) is preferably fabricated from a suitable insulating material and has a plurality of connector sockets 4S that are connected by a suitable multi-strand cable 46 to the control circuitry of the circuit breaker 16 and thus permits various tests to be conducted on the breaker when the drawout assembly 11 is in its disconnected-test position, as hereinafter described. The cable 46 is flexible and extends into the circuit breaker 16 through suitable openings (not shown) in the overlapped medial portions of the guide rail and drive rail components and the back of the circuit breaker housing 18. Some functions facilitated by the cable are bell alarms, contact position perhaps thermocouples, which are not solely control.

For convenience of manufacture, the guide rails 23, 24 and drive rails 26, 27 can comprise the bight portions of U-shaped members that are bolted in overlapping relationship to the back of the circuit breaker housing 18, as illustrated in FIGS. 1 and 1A.

The receptor subassembly 14 (FIGS. 1 and 1A) generally comprises an upstanding support plate 48 that has a rectangular opening 49 and is secured in upstanding position to a pair of stationary power plug-in blocks or components 50 that are rigidly secured to the switchboard structure (not shown), an upper support rail 52, a lower support rail 54, and a drive means consisting of a handle 56 that is secured to and rotatable with a shaft 58 and a pair of spaced drive arms 60, 61 that are secured to the shaft 58 and extend laterally therefrom. The shaft 58 is rotatably mounted on a U-shaped bracket 62 that is fastened to the lower portion of the support plate 48.

Figure 10:
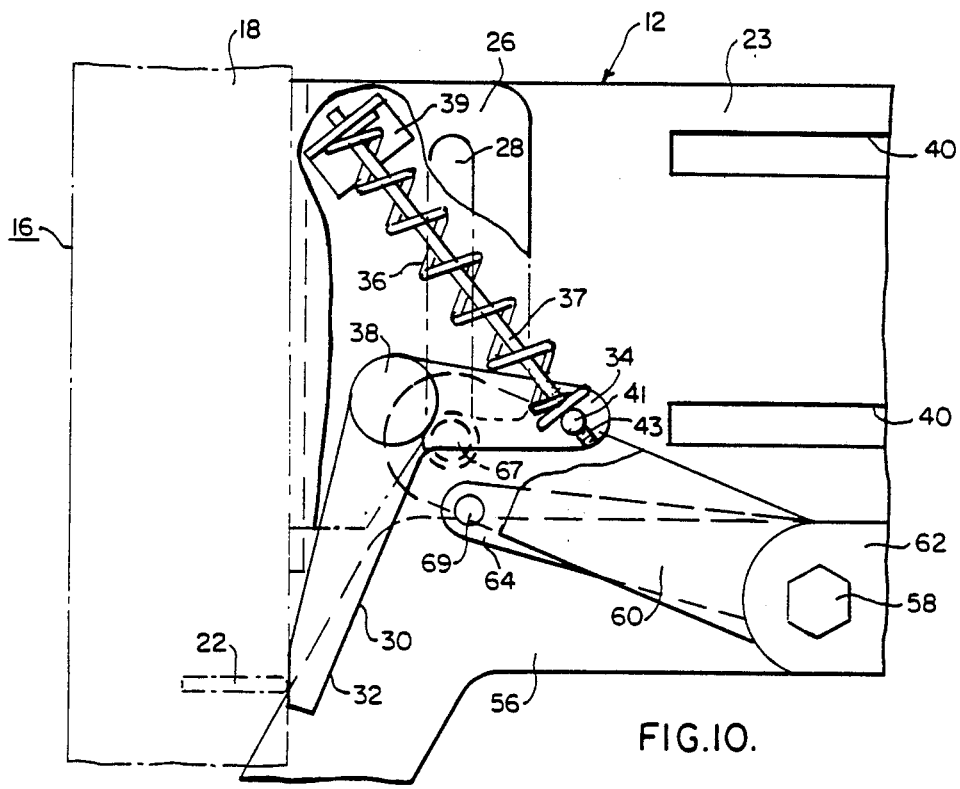
FIG. 10 is an enlarged side elevational view of the interlock lever and toggle spring disposed in engagement with the interlock button of the circuit breaker when the breaker has been racked into its drawn-out test position shown in FIGS. 7–9.

Also connected to the shaft 58 and rotatable therewith is an interlock-actuating arm 64 (FIG. 1A) that is located adjacent the drive arm 60 and is substantially aligned therewith but offset therefrom by a suitable spacer 65 that is mounted on the drive shaft 58. The operating handle 56 is also offset from the other drive arm 61 and associated end of the holding bracket 62 by another spacer 66 that is slipped over the shaft 58. The free ends of each of the drive arms 60, 61 are provided with pins 67, 68 that protrude inwardly toward one another and are adapted to enter and slidingly engage in cam-like fashion the slots 28 in the drive rails 26, 27 (FIG. 10) when the subassemblies 12 and 14 are in telescoped operative relationship and the handle 26 is rotated.

The free end of the actuating arm 64 is also provided with a pin 69 that is disposed to engage and ride along the V-shaped medial surface of the interlock lever 30 in cam-like fashion when the handle 56 and drive shaft 58 are rotated during the racking operations. The structural relationship of the various pins 67, 68, and 69 relative to the drive rails 26, 27 and interlock lever 30 are best seen in FIG. 1A.

The stationary plug-in blocks 50 (FIG. 1) are secured to six primary conductors 51 that are arranged in two groups of three and extend through the respective blocks 50. The tips 53 of the conductors 51 which protrude beyond the blocks 50 are disposed to slip into and firmly engage the primary stab terminals 20 on the back of the circuit breaker housing 18 when the subassemblies 12 and 14 are interfitted with one another in operative relationship and the handle 15 is raised. Thus the circuit breaker 16 is forced into drawn-in position relative to the plug-in blocks 50 by the cam action produced by the drive pins 67, 68 as they are forced upwardly into the slots 28 in the drive rails 26, 27.

A two piece bracket 70 is fastened to the top support rail 52 and is clamped onto another secondary connector component 72 and holds it at a predetermined location between the top support rail 52 and bottom support rail 54. A plurality of pin terminals 73 project outwardly from the secondary connector 72 toward the opening 49 in the support plate 48 and are arranged to be aligned with and enter the sockets 45 of the other secondary connector component 44 mounted on the coupler subassembly 12. The pin terminals 73 are connected to a multistrand cable 74 that extends through a suitable opening in the bracket 70 and is connected to the control and test circuits (not shown) of the switchboard apparatus.

Figure 2:
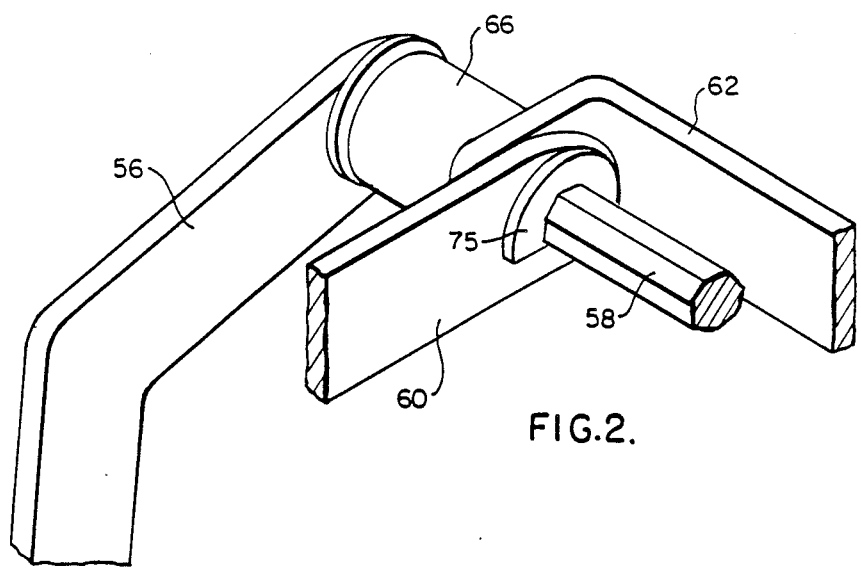
FIG. 2 is a fragmentary enlarged perspective view of portions of the operating handle, drive shaft, holding bracket and one of the drive arms to illustrate the unitary construction of these parts of the drawout assembly.

The drive arm 61 (FIG. 2) is fixedly secured to the drive shaft 58. A lock washer 75 that is inserted into a peripheral recess in the shaft to prevent the arm from sliding on the shaft. The operating handle 56, drive shaft 58, and drive arm 61 accordingly move as a unit relative to the holding bracket 62. Similarly the drive arm 60 and actuating arm 64 are secured on the drive shaft 58 (FIG. 1A) so that they move in unison with the shaft 58. A lockwasher 76 prevents the arm 64 from sliding on the shaft. Torque is transmitted from the shaft 58 to the arms 60, 61 via a hexagonal hole in the arms which mate with the hexagonal shaft 58. The operating handle 56 also mates to the shaft in this manner.

For purposes of illustration, the top rail 52 is omitted in the plan view (FIG. 1A) of the receptor subassembly 14 and thus provide a clear view of the secondary connector component 72 and the manner in which its holding bracket 70 holds the connector 72 and its prong terminals 73 in place above the bottom support rail S2. The connector 72 preferably has a plastic housing of block-like configuration with a tang 77 (FIG. 1A) that projects through a suitable opening in the overlying portion of the bracket 70 and thus locks the connector block 72 firmly in place within the receptor subassembly 14.

The view of the drawout, interlock assembly 11 (FIG. 1A) illustrates the manner in which the secondary connector components 44 and 72 are aligned with one another when the subassemblies 12 and 14 are secured to the circuit breaker housing 14 and stationary plug-in blocks of the switchboard. The alignment of the drive arms 60, 61 with the drive rails 26, 27 and the alignment of the actuating arm 64 with the interlock lever 30 are also clearly shown in FIG. 1A.

Figure 3:
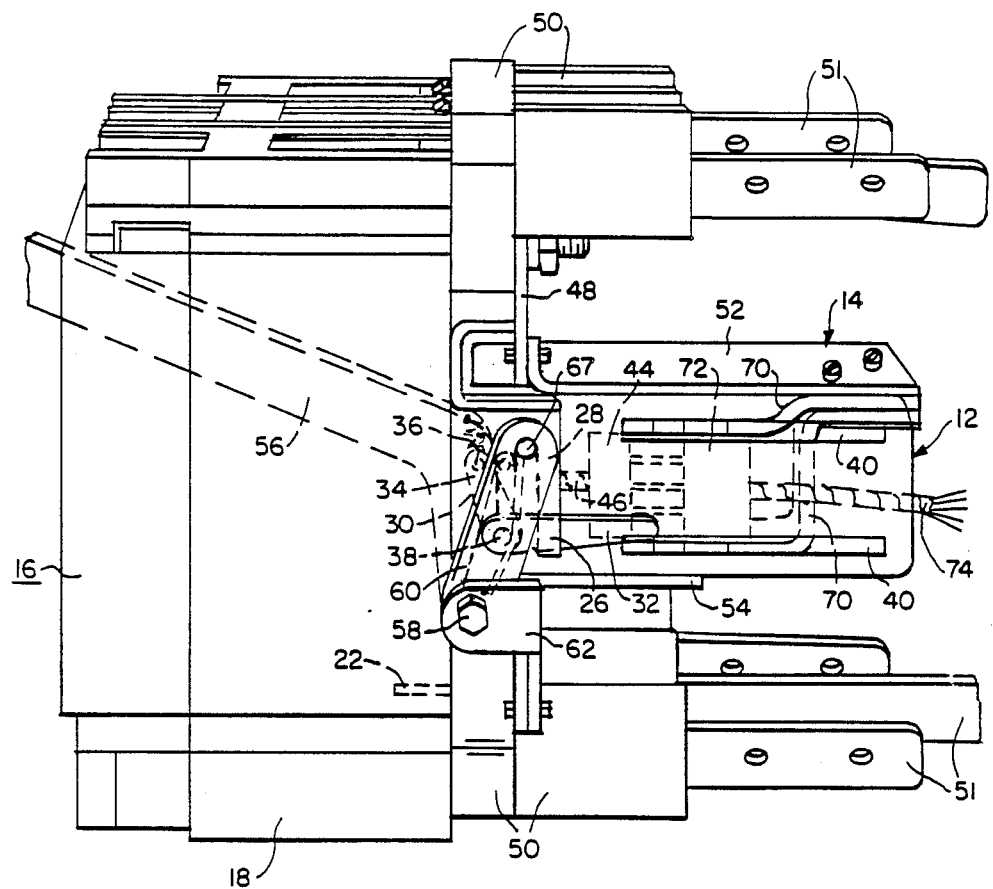
FIG. 3 is a perspective view of the drawout assembly with the coupler and receptor subassemblies in drawn-in relationship with the primary plug-in conductors seated in electrical engagement with the terminals of the circuit breaker.
Figure 4:
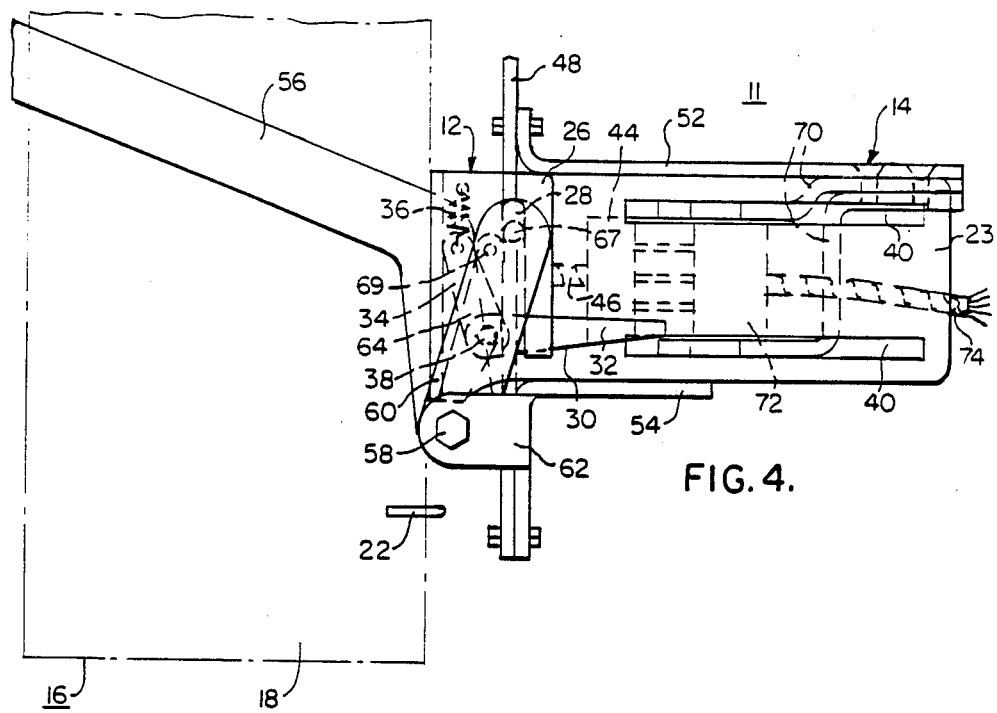
FIG. 4 is a side view of the assembly in its drawn-in position shown in FIG. 3, the breaker and plug-in blocks and conductors of the panelboard being omitted to clarify the illustration.

The coupler subassembly 12 and receptor subassembly 14 are illustrated in their draw-in position (FIG. 3) along with the circuit breaker 16 and the power plug-in blocks 50 and their primary conductors 51. FIG. 4 illustrates in simplified form only the subassemblies 12 and 14 in the same position, with the circuit breaker 16 being shown in phantom. When the assembly 11 is in its draw-in mode, the operating handle 56 has been rotated clockwise to an elevated position (FIG. 3) so that the pins 67, 68 on the end of the drive arms 60, 61 are located at the ends of the slots 28 in the respective drive rails 26, 27. Thus forcing the circuit breaker 16 is held in firm engagement with the plug-in power blocks 50 and locking the stabs 20 on the back of the circuit breaker housing 18 in positive electrical engagement with the protruding tips 53 of the primary conductors 51. As will be obvious to those skilled in the art, the operating handle 56 is of such length that it protrudes through a suitable opening in the cover panel of the distribution switchgear apparatus so that the drawout and interlock assembly 11 can be operated from outside the apparatus.

During the initial racking operation which places the circuit breaker 16 in its drawn-in position (FIGS. 3, 4) the movable secondary connector component 44 engages and is forced into positive electrical engagement with the terminal pins 73 (FIG. 1A) with the sockets 45. Once this juncture has been made, the secondary connector components 44, 72 remain electrically coupled to one another during subsequent racking operations until the circuit breaker 16 has to be withdrawn from the switchboard apparatus and the connectors 44, 72 are decoupled to permit such withdrawal.

In the drawn-in mode the interlock button 22 on the back of the circuit breaker housing 18 is fully depressed (FIG. 3) by the lowermost power plug-in block 50 so that the circuit breaker 16 can operate in its normal fashion. The interlock lever 30 has been rotated so that its upper arm segment 34 collapses the compression spring 36 and the lower arm segment 32 is horizontally disposed in the space between the associated drive rail 26 and guide rail 24. The interlock lever 30 is kept in this elevated position by the toggle action provided by the compression spring 36 in response to the rotation of the lever 30 resulting from the camming action produced by the pin 69 of the actuating arm 64 as the arm 64 rotates along with the drive arms 60, 61 when the shaft 58 is rotated (along with the handle 56) in a clockwise direction. The guide rails 23 and 24 extend through the opening 49 in the support member 48 and are disposed in telescoped, snug-fitting between the horizontal support rails 52, 54, whereby the coupler subassembly 12 is in deep interfitted movable relationship with the stationary receptor subassembly 14.

Figure 6:
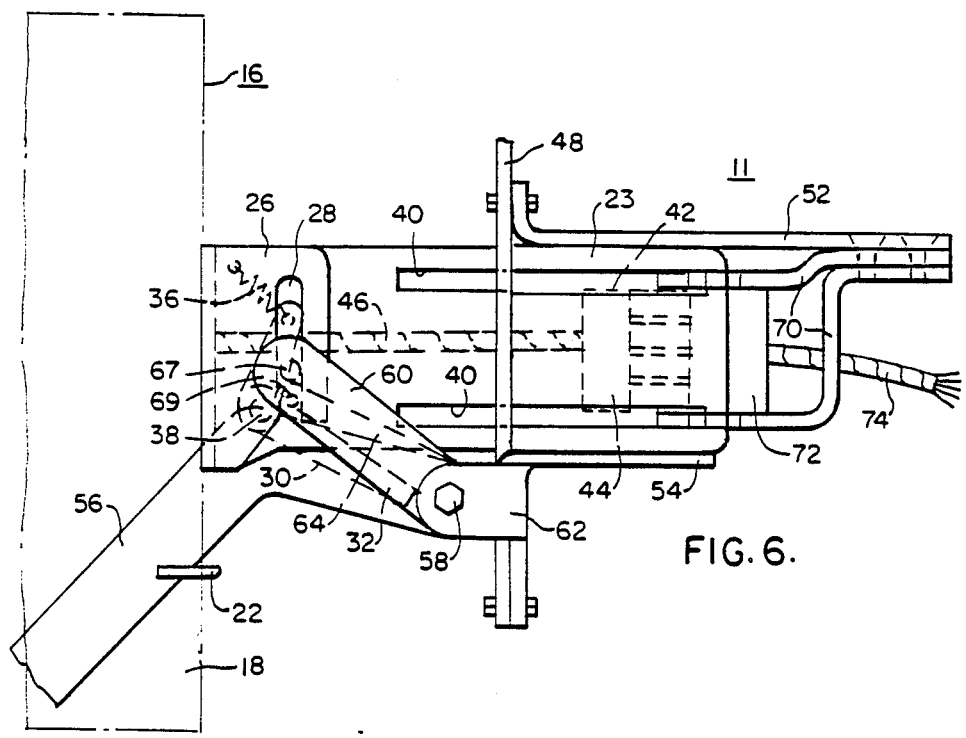
FIGS. 5 and 6 are similar views of the drawout and interlock assembly with the coupler and receptor subassemblies positioned midway between the fully drawn-in and fully drawn-out positions.
Figure 5:
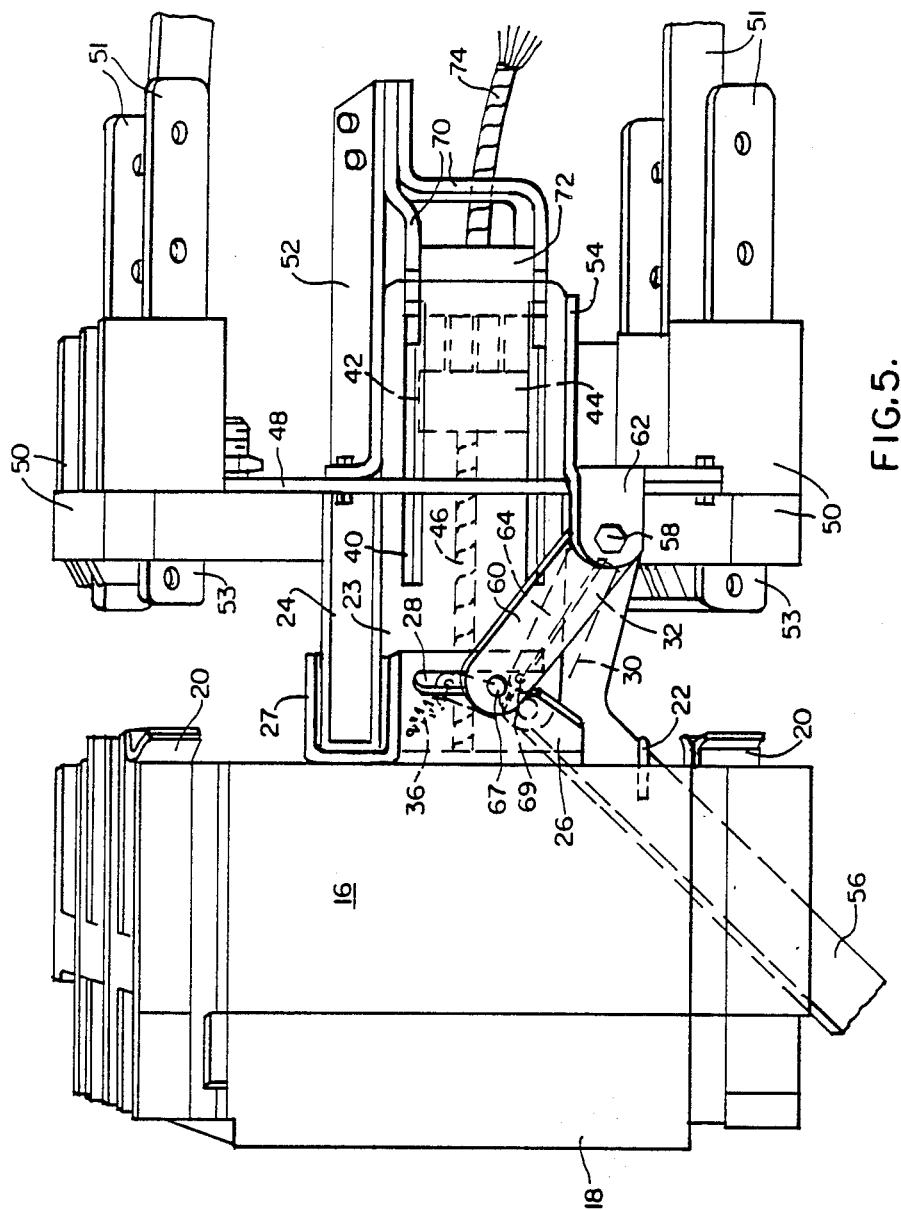

The drawout and interlock assembly 11 is shown in partly drawn-out position in FIGS. 5 and 6. As soon as the circuit breaker 16 is moved a short distance (approximately a sixteenth of an inch or 0.159 mm in the case of the low-voltage circuit breaker here shown) by moving the handle 56 downwardly, the interlock button 22 is released (since it no longer is engaged by the plug-in block 50) and the breaker trips. The length of the protruding tips 53 of the primary conductors 51 is such that they remain in contact with the terminal stabs 20 of the circuit breaker 16 over a travel distance sufficient to insure that the breaker 16 is tripped long before the primary terminals separate.

As the operating handle 56 is rotated further in the counterclockwise direction, the cam action exerted on the V-shaped edge surface of the interlock lever 30 by the pin 69 on the rotating actuating arm 64 pushes the interlock lever 30 in a clockwise direction and primes the toggle arrangement for triggering, once the drawout operation has reached a certain point. Due to the outward thrust applied to the circuit breaker 16 as a result of the camming action produced as the pins 68, 69 of the drive arms 60, 61, the breaker 16 moves away from the plug-in blocks 50. The secondary connector components 44, 72, however, remain coupled and in positive electrical engagement with one another as the lateral projections 42 of the connector block 44 ride along the associated slots 42 in the guide rails 23, 24.

Figure 7:
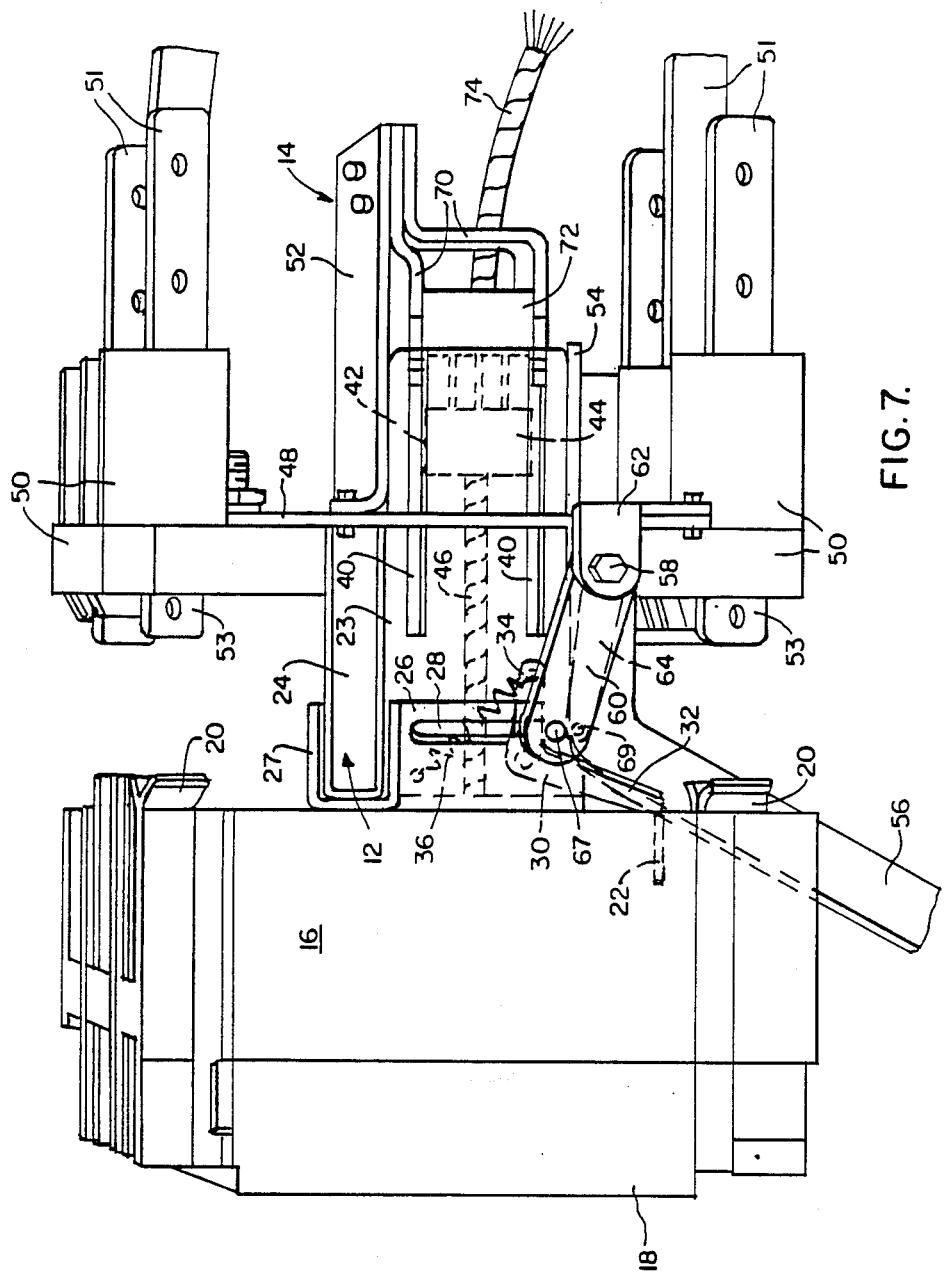
FIGS. 7 and 8 are similar illustrations depicting the coupler and receptor portions of the assembly in their fully drawn-out positions, with the interlock lever actuated and depressing the interlock button to permit the circuit breaker to be operated and tested.
Figure 9:
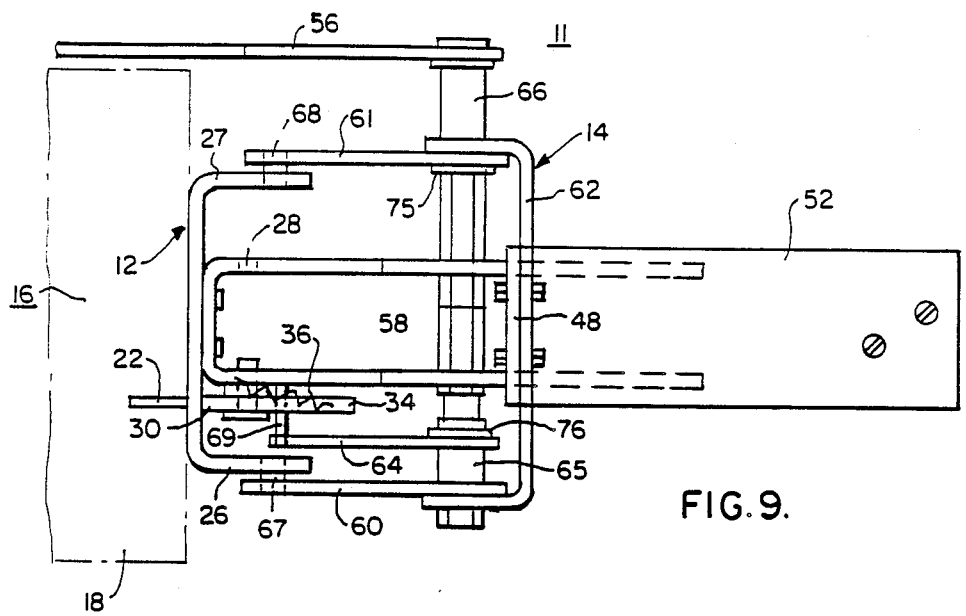
FIG. 9 is a plan view of the drawout and interlock assembly in its drawn-out test position shown in FIGS. 7 and 8.
Figure 8:
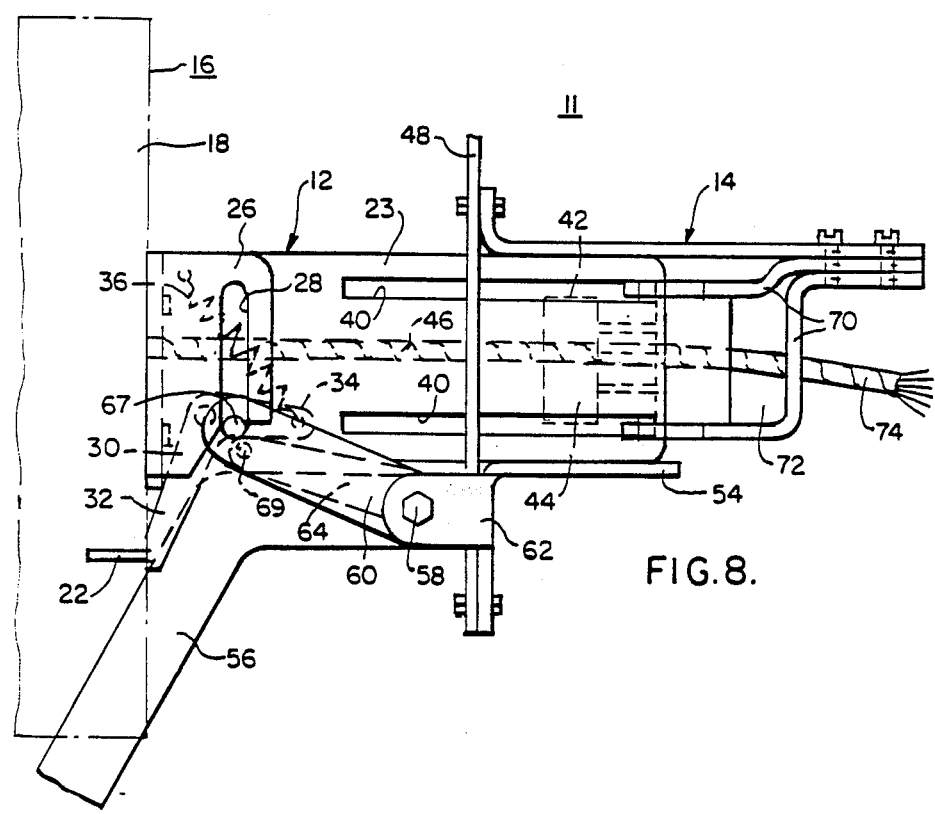

When the assembly 11 has reached its fully drawn-out position (FIGS. 7–9), the action of the compression spring 36 has forced the interlock lever to toggle open and snap down in a clockwise direction so that the lower arm segment 32 of the lever 30 strikes and pushes the interlock button 22 into the breaker housing 18. This frees the trip bar of the breaker 16 and permits normal breaker operation so that any desired tests can be performed. The operating lever 56 is in its lowermost position and the drive arms 60, 61 are in a nearly horizontal position. The secondary connector components 44, 72 remain in coupled relationship to permit the tests on the control circuits of the circuit breaker 16 to be performed even though the breaker 16 is in its drawn-out position and disconnected from the primary plug-in blocks 50. In the fully drawn-out or disconnect-test position (FIGS. 8, 10), the compression spring 36 is fully expanded and holds the free end 32 to the interlock lever 30 in firm pressured engagement with the circuit breaker interlock button 22 and the pins 67, 68 on the ends of the drive arms 60, 61 are located at the entrance of the associated slot openings 28 in the respective drive rails 26, 27.

As will be apparent to those skilled in the art, the improved drawout and interlock assembly 11 of the present invention provides a reliable and inexpensive means for racking a molded case circuit breaker into and out of a panelboard of a distribution switchboard apparatus and similar equipment. The coaction between the drawout and interlock mechanisms is such that the circuit breaker 16 is tripped before the primary circuit is broken and is then restored to normal operating condition for testing once the breaker is fully drawn-out and its primary terminals 20 are separated from the plug-in power blocks 50. The interlock lever 30 is so arranged and shaped that it swings out of the path of the plug-in blocks 50 when the breaker 16 is in its full drawn-in position and thus permits the breaker 16 to seat properly on the main conductors 53. Since the interlock lever 30 is also secured to and rotates with the drive shaft 58, it does not interfere in any way with the rotation of the shaft 58 and it is also located a sufficient distance from the main conductors 53 to prevent arcing through air which could cause electrical shock to the operator.

What is claimed is:

1. A drawout and interlock assembly for manually racking a low-voltage circuit breaker into connected and disconnected-test positions relative to the panelboard of a distribution switchboard apparatus having control circuit means and power plug-in components with a plurality of protruding primary conductors, said circuit breaker having a trip mechanism and an insulating housing with primary electrical connectors engageable by said protruding primary conductors and a depressible interlock button that are disposed on the back of the circuit breaker housing, said interlock button being coupled to the trip mechanism of the circuit breaker in a manner such that the circuit breaker is tripped when the interlock button is released and protrudes beyond the back of the circuit breaker housing, said drawout and interlock assembly comprising:

(a) a first subassembly that is secured to the power plug-in components of the panelboard and comprises a laterally-extending receptor structure having a rotatable operating handle, a drive mechanism rotatable by and with the operating handle, and a first secondary connector component that is mounted at a predetermined fixed location within the receptor structure and is connectable with the control circuit means of the panelboard;

(b) a second subassembly that is secured to the back of the circuit breaker housing and comprises a laterally-extending coupler structure that is disposed in slidable telescoped relationship which said receptor structure and includes a second secondary connector component that connectable with electrical control means within the circuit breaker;

(c) said coupler structure being mechanically linked to said drive mechanism in a manner such that rotation of the operating handle and drive mechanism causes the coupler structure and the attached circuit breaker to be driven as a unit toward and away from said receptor structure and power plug-in components and thereby move the circuit breaker into said connected and disconnected-test positions relative to the panelboard and power plug-in components; and (d) means for automatically controlling the position of the interlock button and operational status of the circuit breaker in response to the rotation of the operating handle and drive mechanism comprising an interlock lever that is pivotally mounted on said coupler structure and is disposed to engage the interlock button, and means for automatically actuating said interlock lever in response to the rotation of the operating handle and drive mechanism;

said first and second secondary connector components being constructed and disposed to mate and electrically connect with one another when the coupler structure and circuit breaker are first moved as a unit by the operating handle and drive mechanism into connected position with the panelboard and power plug-in components and remain connected when the coupler structure and circuit breaker are thereafter moved to said disconnected-test position by the operating handle and drive mechanism.

2. The drawout and interlock assembly of claim 1 wherein said interlock lever and lever-actuating means are so arranged and oriented relative to said operating handle and drive mechanism that the interlock button is depressed by said interlock lever only when the circuit breaker is in the disconnected-test position relative to the panelboard and the power plug-in components.

3. The drawout and interlock assembly of claim 1, wherein:
   one of the primary electrical connectors on the back of the circuit breaker housing is located adjacent to the interlock button, and
   the plug-in component associated with the primary conductor which engages said one primary electrical connector presses against and depresses the interlock button when the circuit breaker is in connected drawn-in position relative to the panelboard and power plug-in components of the panelboard.

4. The drawout and interlock assembly of claim 1, wherein:
   the receptor structure of said first subassembly comprises (a) an upstanding support member that is secured to the power plug-in components of the panelboard and has an opening therethrough, and (b) an upper and a lower support rail that are integral with and extend laterally from the opening in said support member in paired spaced-apart relationship, and
   the coupler structure of said second subassembly comprises a pair of guide rails that are fastened to the back of the circuit breaker housing and extend therefrom in upstanding spaced-apart relationship,
   the opening in said support member being of such size and configuration and the spacing between said upper and lower support rails being such that the guide rails extend through said opening into the space between the support rails and effect a snug sliding telescopic fit therewith so that said guide rails and coupler structure are reciprocally movable within the receptor structure.

5. The drawout and interlock assembly of claim 4, wherein:
   said drive mechanism comprises a shaft that is rotatably mounted on said support member and is fastened to the operating handle, and a pair of spaced drive arms that are secured to and rotatable with said shaft, said drive arms being substantially aligned with one another and each having a pin disposed in the free end thereof, and
   said coupler structure includes a pair of upstanding laterally-extending drive rails that are disposed in outboard spaced-apart relationship with the respective guide rails, each of said drive rails having a slot opening therein that is slidingly engaged by the pins on the respective drive arms and together therewith produces a cam action that drives the guide rails and attached circuit breaker toward or away from the power plug-in components and panelboard when the drive arms are rotated by the drive shaft and operating handle.

6. The drawout and interlock assembly of claim 5, wherein said interlock lever is of generally L-shaped configuration and pivotally attached at a medial part thereof to one of said guide rails at a location such that one arm segment of the interlock lever swings toward and away from the interlock button on the back of the circuit breaker housing and the other arm segment thereof swings toward and away from the support member in the space between the associated guide rail and drive rail.

7. The drawout and interlock assembly of claim 6 wherein:
   the medial part of said generally L-shaped interlock lever is V-shaped, and
   the means for actuating said interlock lever comprises;
   (a) an actuating arm that is attached to and rotates with said drive shaft and extends toward the arm segment of said interlock lever that is disposed between the associated guide rail and drive rail, and
   (b) a compression spring that is attached to the end of the arm segment of the interlock lever that is disposed in and swings within the space between said associated guide rail and drive rail, the other end of said compression spring being attached to said associated guide rail at a location such that said compression spring rotates the L-shaped lever in toggle-like fashion into and out of engagement with the interlock button on the back of the circuit breaker housing in synchronism with the rotation of the operating handle, drive shaft and actuating lever,
   said actuating arm being of such length and configuration and being so disposed relative to the drive arms that the free end of the actuating arm slidingly engages and moves along the V-shaped medial part of said generally L-shaped interlock lever in cam-like fashion when the drive shaft and actuating arm are rotated by the operating handle and thereby triggers the toggle movement of the compression spring and interlock lever.

8. The drawout and interlock assembly of claim 4 wherein:
   said first secondary connector component is mounted on said upper and lower support rails in the space therebetween, and
   said second secondary connector component is mounted between said guide rails.

9. The drawout and interlock assembly of claim 8 wherein said secondary connector component is movably secured to said guide rails and thereby enables the circuit breaker and guide rails to be moved into said disconnected-test position from said connected position relative to the panelboard and support rails without breaking the electrical connection between said first and secondary connector components.

10. The drawout and interlock assembly of claim 8, wherein one of said secondary connector components has a plurality of spaced connector pins protruding therefrom and the other of said secondary connector components has a corresponding number of spaced connector sockets that are aligned with and receptive of said connector pins in slip-fitting fashion when the drawout assembly is actuated by the operating handle.

* * * * *